UNITED STATES PATENT OFFICE.

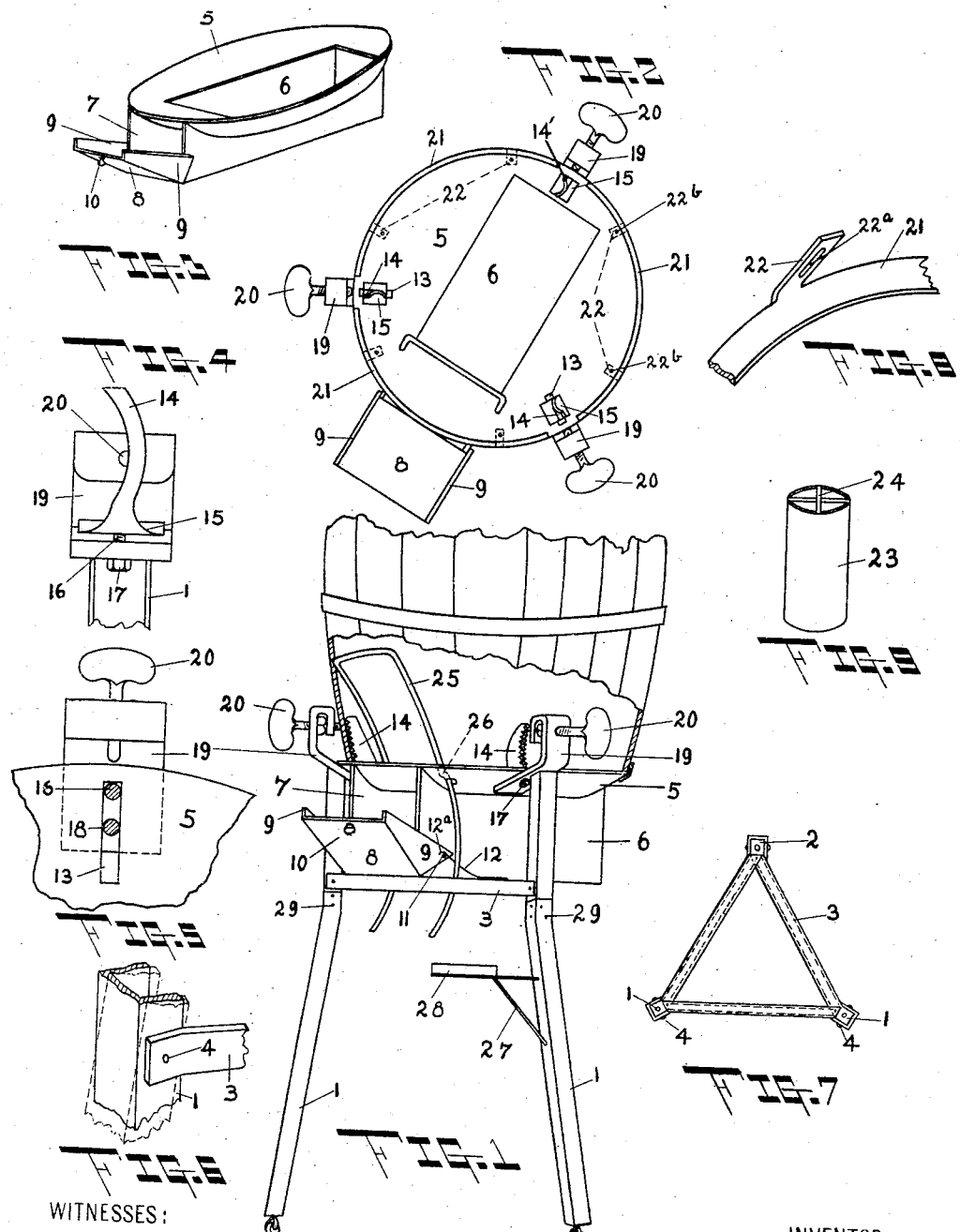

ALBERT HITZERT, OF SAGINAW, MICHIGAN.

BARREL-CABINET.

No. 866,724.   Specification of Letters Patent.   Patented Sept. 24, 1907.

Application filed March 7, 1907. Serial No. 361,145.

*To all whom it may concern:*

Be it known that I, ALBERT HITZERT, a citizen of the United States, residing at Saginaw, in the county of Saginaw and State of Michigan, have invented certain new and useful Improvements in Barrel-Cabinets; and I do hereby declare the following to be a full, clear, and exact description of the invention, such as will enable others skilled in the art to which it appertains to make and use the same.

My invention relates to cabinets or stands designed for use in connection with barrels, kegs, pails or other containers of crackers, cakes, biscuits, candies or other articles.

Hitherto it has been customary to scoop out crackers, candies or other articles of food packed in receptacles from which the covers have been removed. Obviously, the scoop breaks up the material besides which a considerable amount is handled over while in the receptacle.

One object of my invention is the provision of means for supporting a receptacle in such a manner that the contents may be removed part at a time, without breaking up or handling the remainder.

A further object is the provision of means for suitably supporting the receptacles in a convenient manner.

A still further object is the provision of means for removably clamping or fastening the receptacle and cabinet together.

Still another object is the provision of means for permitting an adjustment of the fastening devices relative to the receptacle.

A further object is the provision of means for closing the delivery opening of the cabinet when not in use.

Another object is the provision of a cabinet having a receiving chamber to accommodate the contents of the receptacle.

It is customary in packing barrels of crackers, for instance, to insert at least one partition intermediate the top and bottom of the barrel.

Still another object of my invention is the provision of means for tilting such partition to permit the entire contents of the receptacle to be fed to the receiving or delivery chamber.

A further object of my invention is the provision of means for improving the appearance of the receptacle as it is supported by the cabinet.

To these and other ends, therefore, my invention consists in certain novel features and combinations, such as will be more fully described hereinafter and particularly set forth in the claims.

In the accompanying drawings, Figure 1 is a side view of my invention applied to a barrel, parts being broken away, to better disclose the device; Fig. 2 is a top plan view of a cabinet stand, the barrel being removed; Fig. 3 is a detail perspective view of the pan showing the closure for the delivery chamber; Figs. 4 and 5 are detail side and top plan views of the means for releasably fastening the cabinet and receptacle together; Fig. 6 is a detail perspective view of one of the legs showing the pivot; Fig. 7 is a detail top plan view of the bracing frame; Fig. 8 is a detail perspective view of a portion of a removable rim; and Fig. 9 is a detail perspective view reduced in size, one form of screen for concealing the receptacle.

The drawings illustrate but one embodiment of a number of constructions in which my invention is capable of incorporation.

The invention as disclosed by the drawings comprises, preferably, three legs (1) (1) and (2) forming a tripod, the legs being connected intermediate their ends by the triangular frame (3) shown in Fig. 7. Though I have shown the legs and bracing frame formed from channel iron, it is obvious that other material can be used if desired. Legs (1) (1) are pivotally connected to the frame (3), as shown in Fig. 6, by means of the single bolts (4), whereas I prefer to rigidly secure the leg (2) to the frame, it being sufficient to have two only of the three legs adjustable, as will appear further on.

Supported, it may be, on the frame (3) is the cabinet which comprises a circular pan (5) having inclined sides leading to the rectangular delivery chamber (6) depending therefrom, such chamber being open at the top and one end, as at (7), the open end being provided with a door (8) hinged in any convenient manner at its lower edge, the door being provided with wings (9) (9) adapted to embrace the exterior faces of the side walls of the delivery chamber. The door carries a knob (10) whereby it may be swung down when access to the delivery chamber is desired.

As one means for causing the door to close, I may provide a stud (11) on one or both wings of the door, a spring (12) having its free end bearing on the studs in order that as the door is moved from its open position so as to bring the stud off dead center relative to the pivotal point of the door, the pressure of the spring on the stud will close the door automatically. The spring (12) at its free end is provided with a hook (12ª) to prevent the door from being moved beyond the spring and also to support the door in an inclined position when open. Other means may be provided for closing the door, and hence I do not wish to limit myself to the particular structure set forth.

The door will remain open when the stud is on or past dead center. When the door is in its open position it forms an incline leading to the floor of the delivery chamber, whereby to facilitate the movement of the scoop.

Barrels, kegs or other receptacles differ in size at their ends and often are not perfectly circular. Therefore, it is necessary to provide an adjustable means for securing the barrel on the cabinet.

As one means for accomplishing this object, I provide the radially extending slots (13) (13) in the pan adjacent the upper ends of the legs (1) (1), over which slots are mounted the toothed jaws (14) laterally curved, as shown, to prevent them from engaging throughout their lengths in a joint between two staves of the receptacle, for instance. These jaws are also inclined outwardly, as shown, at the left in Fig. 1, to engage the outwardly bulging inner faces of the receptacles. The jaws are shouldered at their lower ends, as at (15) (15), to afford a solid base engaging the inclined surface of the pan (16) and passing through the slots and receiving the nuts (17) adapted to secure the jaw firmly to the inwardly extending arms of the L-clamps (19) hereinafter described. Guide studs (18) are carried by each jaw and depend into the slots to prevent rotation of the jaw relative to the slot.

The threaded pins (16) pass through the inwardly extending arms of L-clamps (19), the nuts (17) connecting the jaws and clamps rigidly together. These L-clamps are mounted on the upper ends of the legs (1) (1) pivoted to the frame (3). The upper bent ends of the clamps carry thumb screws (20) (20), the inner ends of which are adapted to engage and bear against the outer surface of the receptacle whereby the latter is releasably held between the jaws (14) and the inner ends of the thumb screws.

The rear leg (2) carries a clamp (19') similar to the clamps on the legs (1) (1), and located opposite the clamp is a jaw (14'), but the clamp, jaw and leg (2) are not adjustable relative to each other or to the pan (5).

The edge of the receptacle rests upon the inclined surface of the pan and is received between the clamps and jaws. In order to make a neat appearing construction, I may provide a sectional rim composed of sections (21) (21) applied to the edge of the pan, each section being provided with the lips (22) adapted to take beneath the inclined face of the pan. These lips are slotted, as at (22$^a$), rivets (22$^b$) passing through the slots into the pan in such manner as to permit the sections to have a free play back and forth.

When the cabinet is inverted to secure it to the edge of the receptacle, the sectional rims, by their own gravity, move or drop outwardly so as not to interfere with the proper placing and fastening of the cabinet on the open end of the receptacle. The rim conceals the joint between the edge of the receptacle and the pan. It is necessary to make the rim in sections, in order that the sections may fit between the fastening means for securing the receptacle on the cabinet.

The cabinet is designed for use and display in stores or other places and as it frequently happens that the surface of the receptacle is dirty or otherwise unsightly, its display would detract from the appearance of the device, to which end I prefer to cover the receptacle with a screen of some kind which may receive advertising matter, and as one means, I have illustrated in Fig. 8, a cylindrical screen (23) of textile material or paper designed to be slipped over the receptacle after it is placed on the cabinet, the straps (24) serving to prevent the screen from slipping below the upper end of the receptacle. This screen may be blackened to receive chalk marks indicating the goods dispensed and their price or any other indicia or it may bear advertising matter.

In applying my dispensing cabinet to the receptacle, I first remove the top or cover of the receptacle disclosing its contents, after which I invert the cabinet, first loosening the thumb screws (20) to permit the edges of the receptacle to be received between the jaws and clamps. The jaws and clamps are then slipped over the edge of the barrel, the legs (1) (1) of the cabinet having been oscillated to move the jaws (14) (14) and clamps (19) relative to the pan (5) until alined with the edge of the barrel, whereupon the clamps and jaws fit over and embrace the edge of the barrel, after which the thumb screws (20) are tightened. The cabinet is now returned to normal position, with the receptacle inverted, whereby its contents are discharged into the delivery chamber, the inclined pan preventing the lodgment of the contents permanently thereon, while still supporting the contents so that it is not all crowded into the delivery chamber at one time, nor is the entire weight of the contents of the receptacle supported by that portion in the delivery chamber. The operator may scoop out the contents from the delivery chamber from time to time in the obvious manner, the material being supplied to the chamber as it is removed therefrom.

It will be seen that the weight of the receptacle and its contents are supported directly upon the legs by reason of the L-shaped clamps which project beneath and serve to brace the pan.

In order to prevent the usual pasteboard partitions placed in cracker barrels and the like, for the purpose of easing the contents of the barrel, from interfering with the feed of the contents to the delivery chamber, I provide a curved member (25) U-shaped, as shown, the arms of which embrace the delivery chamber and pass through apertures in the pan. This member is slidable into the receptacle through the apertures in the pan and owing to its inclination, it engages one end of and tips the partition so that the contents of the receptacle above the partition may discharge into the delivery chamber.

In order to retain the member in the raised position shown in Fig. 1, I provide the arms with shoulders (26) adapted to engage the pan and retain the member elevated, whereby the partition is retained in tilted position. When the member is to be withdrawn all that is necessary is to swing it to disengage the shoulders from the pan, after which it may be withdrawn to the position shown in Fig. 2.

The device can be made in sizes and shapes to fit barrels, kegs, pails or other receptacles. It is also desirable to provide means for supporting bags as they are being filled, to which end I removably secure in any suitable manner, a bracket (27) to one of the front legs (1) (1) of the cabinet, the bracket being equipped with a rest plate (28) on which the bottom of the bag is placed, while the upper end is held open to receive a portion of the contents of the barrel. The bracket and rest plate may be removed when the cabinet is being applied to the receptacle, if desired.

The outwardly bent portions of the legs are removably secured to the upper portions of the legs, as at (29) (29) to enable them to be removed and the device set on a counter or other suitable place, when desired.

Having thus fully disclosed my invention, what I claim as new is—

1. A dispensing cabinet comprising an inclined pan provided with a central aperture, a receptacle the edge of the receptacle adjustably received and supported upon the inclined surface of the pan, the inclined surface of the pan adapted to receive receptacles of different cross sectional areas, a delivery chamber depending beneath and inclosing the aperture in the pan, and a hinged closure for one end of the delivery chamber.

2. A dispensing cabinet comprising a frame, legs pivotally secured to the frame, clamps carried at the upper ends of the legs, thumb screws mounted in the clamps, a pan supported on the clamps, the pan provided with slots, toothed jaws mounted on the pan, means carried by the jaws and passing through the slots to engage the clamps, and a delivery chamber communicating with the pan.

3. The combination with an inverted receptacle, of a dispensing cabinet comprising a suitably supported inclined pan on the incline of which the receptacle rests, a delivery chamber communicating with the pan, one end of the chamber being open, a door for the opening, a stud on the door and a spring, the free end of which engages the stud and is adapted to hold the door open when the stud has passed through a portion of its arc of travel.

4. The combination with an inverted receptacle, of a dispensing cabinet comprising a suitably supported inclined pan on which the receptacle rests, a delivery chamber communicating with the pan, the pan being slotted, a curved toothed jaw mounted on the pan, a guide stud carried by the jaw and received in the slot, a threaded pin carried by the jaw and projecting through the slot, an adjustable clamp through which the pin passes, means for securing the pin and clamp together and a thumb screw carried by the clamp.

5. The combination with an inverted receptacle, of a dispensing cabinet comprising a suitably supported inclined pan on which the receptacle rests, a delivery chamber communicating with the pan, and sectional means slidingly secured to the pan for concealing the joint between the pan and the receptacle.

6. The combination with an inverted receptacle, of a dispensing cabinet comprising a suitably supported inclined pan on which the receptacle rests, a delivery chamber communicating with the pan, and a curved U-shaped member passing loosely through the pan, the arms of the member being shouldered.

7. The combination with an inverted receptacle, of a suitably supported pan on which the lower open end of the receptacle rests, a delivery chamber communicating with the pan and receptacle, curved jaws on the pan adapted to engage the interior surface of the receptacle and suitably supported adjustable means for engaging the exterior surface thereof.

8. The combination with an inverted receptacle, of a dispensing cabinet comprising a suitably supported inclined pan on which the receptacle rests, a delivery chamber communicating with the pan, one end of the chamber being open, a door for the opening, a stud on the door, a spring, the free end of which engages the stud, and a hook on the spring adapted to take over the stud to limit its opening movement.

9. The combination with an inverted receptacle, of a dispensing cabinet comprising a suitably supported inclined pan on which the receptacle rests, a delivery chamber communicating with the pan, and sectional means slidingly secured to the pan for concealing the joint between the pan and the receptacle, the sectional means comprising arc shaped body portions, slotted lips carried by the body portions and bent at an angle thereto, and fastening means passing through the slots into the pan near its periphery.

10. The combination with a receptacle, of a dispensing cabinet comprising an inclined pan on which the receptacle rests, a delivery chamber communicating with the pan, the chamber provided with an opening, means for closing the opening, a rigid frame, legs pivotally secured intermediate their ends to the frame, and means connected with the upper ends of the legs for releasably securing the receptacle in position on the pan.

11. A dispensing cabinet comprising an inclined pan, a delivery chamber communicating therewith, a rigid frame, legs pivoted to the frame, and means carried by the legs for releasably securing a receptacle on the pan.

In testimony whereof, I affix my signature in presence of two witnesses.

ALBERT HITZERT.

Witnesses:
A. A. EASTERLY,
RALPH S. WARFIELD.